US008625999B2

United States Patent
Robinson et al.

(10) Patent No.: US 8,625,999 B2
(45) Date of Patent: Jan. 7, 2014

(54) MODULATOR FOR FREQUENCY-SHIFT KEYING OF OPTICAL SIGNALS

(71) Applicant: Massachusetts Institute of Technology, Cambridge, MA (US)

(72) Inventors: Bryan S. Robinson, Arlington, MA (US); Don M. Boroson, Needham, MA (US); Scott A. Hamilton, Lexington, MA (US); Shelby J. Savage, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/748,777

(22) Filed: Jan. 24, 2013

(65) Prior Publication Data

US 2013/0148983 A1    Jun. 13, 2013

Related U.S. Application Data

(62) Division of application No. 12/530,660, filed as application No. PCT/US2008/056012 on Mar. 6, 2008, now Pat. No. 8,401,398.

(60) Provisional application No. 60/895,756, filed on Mar. 20, 2007.

(51) Int. Cl.
*H04B 10/04* (2011.01)

(52) U.S. Cl.
USPC .............................. 398/187; 398/83; 398/183

(58) Field of Classification Search
USPC ...................................... 398/82–85, 183–188
See application file for complete search history.

(56) References Cited

U.S. PATENT DOCUMENTS

| 4,288,785 | A | 9/1981 | Papuchon et al. |
| 6,754,411 | B2 | 6/2004 | Ahmadvand et al. |
| 7,277,603 | B1 | 10/2007 | Roberts et al. |
| 2003/0035606 | A1 | 2/2003 | Hajjar et al. |
| 2003/0179972 | A1* | 9/2003 | Gerlach et al. ................. 385/1 |

(Continued)

OTHER PUBLICATIONS

Toba, Hiromu et al., "A 100-Channel Optical FDM Transmission/Distribution at 622 Mb/s over 50 km", Journal of Lightwave Technology, vol. 8, No. 9, Sep. 1990, pp. 1396-1401.

(Continued)

*Primary Examiner* — Dzung Tran
(74) *Attorney, Agent, or Firm* — Schmeiser Olsen & Watts LLP; William G. Guerin

(57) ABSTRACT

Described are an FSK modulator and a method for large-alphabet FSK modulation. The FSK modulator and the method are based on filtering of a multi-tone optical source such as a mode-locked laser which provides a comb distribution of tones. A frequency-selective component selects for transmission a subset of the tones. In various embodiments the frequency-selective component is a Mach-Zehnder interferometer filter or a microring resonator filter. A second frequency-selective component selects a subset of the tones from the comb distribution provided by the first frequency-selective component. Still more frequency-selective components can be used according to the number of tones supplied by the multi-tone optical source to the FSK modulator. The optical signal exiting the last frequency-selective component includes only a single tone which corresponds to the symbol to be transmitted.

6 Claims, 8 Drawing Sheets

(56) References Cited

U.S. PATENT DOCUMENTS

2004/0047022 A1* 3/2004 Hatayama et al. ............ 359/238
2004/0114867 A1 6/2004 Nielsen et al.
2004/0202430 A1 10/2004 Scheuer et al.
2006/0029395 A1 2/2006 Kim et al.
2009/0110401 A1* 4/2009 Sakharov ........................ 398/79
2009/0232518 A1 9/2009 Caton et al.
2010/0150495 A1* 6/2010 Kawanishi et al. ............... 385/3

OTHER PUBLICATIONS

Nosu, Kiyoshi et al., "Optical FDM Transmission Technique", Journal of Lightwave Technology, vol. LT-5, No. 9, Sep. 1987, pp. 1301-1308.

Little, B.E. et al, "Microing Resonator Channel Dropping Filters", Journal of Lightwave Technology, vol. 5, No. 6, Jun. 1997, pp. 998-1005.

* cited by examiner

MODULATOR FOR FREQUENCY-SHIFT KEYING OF OPTICAL SIGNALS

RELATED APPLICATIONS

This application is a divisional of U.S. patent application Ser. No. 12/530,660, filed Sep. 10, 2009, titled "Modulator for Frequency-Shift Keying of Optical Signals," which is the National Stage of International Application No. PCT/US08/56012, filed Mar. 6, 2008, titled "Modulator for Frequency-Shift Keying of Optical Signals" which claims the benefit of the earlier filing date of U.S. Provisional Patent Application Ser. No. 60/895,756, filed Mar. 20, 2007, titled "High-Speed Modulator for Frequency-Shift Keying," the entireties of which are incorporated by reference herein.

GOVERNMENT RIGHTS IN THE INVENTION

This invention was made with United States government support under Contract No. FA8721-05-C-0002 awarded by the United States Air Force. The government may have certain rights in the invention.

FIELD OF THE INVENTION

The present invention relates generally to optical communications based on frequency-shift keying (FSK). More particularly, the invention relates to large-alphabet FSK modulation at high symbol rates using a serial configuration of filter stages based upon Mach-Zehnder interferometers or microring resonators.

BACKGROUND OF THE INVENTION

Power efficient optical links are useful for a number of applications such as high-bandwidth free-space communications. The most efficient optical communications links utilize large-alphabet orthogonal modulation formats such as pulse-position modulation or frequency-shift keying (FSK) modulation. For FSK modulation, a transmitter transmits k bits of information by sending one of M possible frequencies during each symbol period where $M=2^k$. The receiver determines which one of the M frequencies was transmitted in order to receive the k bits of information.

FIG. 1 shows a generic configuration for an FSK transmitter 10. The transmitter 10 includes a transmitter source 14, an FSK modulator 18, an optical power amplifier 22 and transmit optics 26. The FSK modulator 18 is used to select one of M optical frequency components (i.e., "tones") in the optical signal generated by the transmitter source 14. The power amplifier 22 increases the optical power of the signal transmitted by the FSK modulator 18 and the transmit optics 26 are used to condition the optical signal for transmission to one or more receivers. For example, the transmit optics 26 can include optical components to achieve a desired beam geometry for the FSK-modulated optical signal for free-space transmission or for launching into an optical fiber.

There are several techniques that have been demonstrated for transmission of optical FSK waveforms. As shown in FIG. 2, a tunable laser 30 can be used as the combination of the transmitter source 14 and FSK modulator 18 of FIG. 1. The tunable laser 30 is tuned to a single tone by varying a bias current or by changing the characteristics of the laser cavity. The illustrated configuration 10' is typically limited to symbol rates of a few GHz or less. An alternative configuration 10" is shown in FIG. 3 and includes a number M of source lasers 32A to 32M (generally 32) where each source laser 32 operates on a unique tone. Each source laser 32 is intensity modulated by direct modulation of the laser current or, as shown, using an external modulator 34A to 34M (generally 34). The external modulators 34 are activated by control signals so that an optical signal from only one source laser 30 is transmitted during a symbol period. The optical signals exiting the external modulators 34 are combined along a single optical path by a combiner 36 (e.g., a wavelength division multiplexing (WDM) combiner) although during normal operation only one of the external modulators 34 permits its optical signal to be transmitted to the combiner 36.

While the transmitter configuration 10" illustrated in FIG. 3 is useful at high symbol rates (e.g., rates exceeding 40 GHz), the complexity of the transmitter is impractical for a large number M of source lasers 32. For example, if the number M of source lasers 32 in the transmitter is 1,024, the number of external modulators 34 required is 1,024.

SUMMARY OF THE INVENTION

In one aspect, the invention features an FSK modulator for optical communications. The FSK modulator includes a first filter stage and a second filter stage. The first filter stage has an input optical path, an output optical path and a first microring resonator. The input optical path receives a multi-tone optical signal. The first microring resonator has a first optical path length and is disposed between the input and output optical paths. An electro-optic modulator is disposed on the first microring resonator to modulate the first optical path length in response to a first control signal. A first filtered optical signal having a subset of the tones in the multi-tone optical signal is provided in the output optical path of the first filter stage. The second filter stage has an input optical path in optical communication with the output optical path of the first filter stage, an output optical path and a second microring resonator. The second microring resonator has a second optical path length and is disposed between the input and output optical paths of the second filter stage. An electro-optic modulator is disposed on the second microring resonator to modulate the second optical path length in response to a second control signal. A second filtered optical signal having a subset of the tones in the first filtered optical signal is provide in the output optical path of the second filter stage.

In another aspect, the invention features an FSK modulator for optical communications. The FSK modulator includes a first filter stage and a second filter stage. The first filter stage has an input optical path, an output optical path and a first microring resonator. The input optical path receives a multi-tone optical signal. The first microring resonator has a first optical path length and is disposed between the input and output optical paths. At least one electro-optic modulator electrode is disposed on the first microring resonator to modulate the first optical path length in response to at least one binary control signal. A first filtered optical signal having a subset of the tones in the multi-tone optical signal is provided in the output optical path of the first filter stage. The second filter stage has an input optical path in optical communication with the output optical path of the first filter stage, an output optical path and a second microring resonator. The second microring resonator has a second optical path length and is disposed between the input and output optical paths of the second filter stage. At least one electro-optic modulator electrode is disposed on the second microring resonator to modulate the second optical path length in response to at least one binary control signal. The numbers of electro-optic modulator electrodes in the first and second microring resonators are different and a length of at least one of the electro-optic modulator electrodes of one of the microrings is less than the lengths of the electro-optic modulator electrodes of the other microring. At least one tone of the multi-tone optical signal is selected for transmission through the first and second filter stages according to the binary voltage signals applied to the electro-optic modulator electrodes of the first and second microrings.

BRIEF DESCRIPTION OF THE DRAWINGS

The invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

In brief overview, the invention relates to an FSK modulator and a method for large-alphabet (i.e., many different transmission frequencies) FSK modulation at high symbol rates (e.g., greater than 40 GHz). The method is based on filtering of a multi-tone optical source such as a mode-locked laser which provides a comb distribution of tones. A frequency-selective component selects for transmission a subset of the tones (e.g., "alternate" tones) in the comb distribution. A second frequency-selective component selects a subset of the tones from the comb distribution provided by the first frequency-selective component. Still more frequency-selective components can be used according to the number of tones supplied by the multi-tone optical source to the FSK modulator. The optical signal exiting the last frequency-selective component of the FSK modulator includes only a single tone which corresponds to the symbol to be transmitted. In one embodiment the frequency-selective components are Mach-Zehnder interferometer filter stages as described in detail below. In another embodiment the frequency-selective optical components are microring resonator filter stages as described in more detail below.

Figure 1:
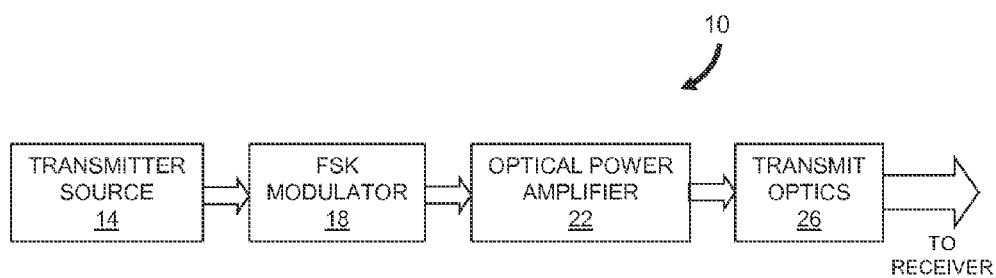
FIG. 1 is a high level block diagram of an FSK transmitter.
Figure 2:
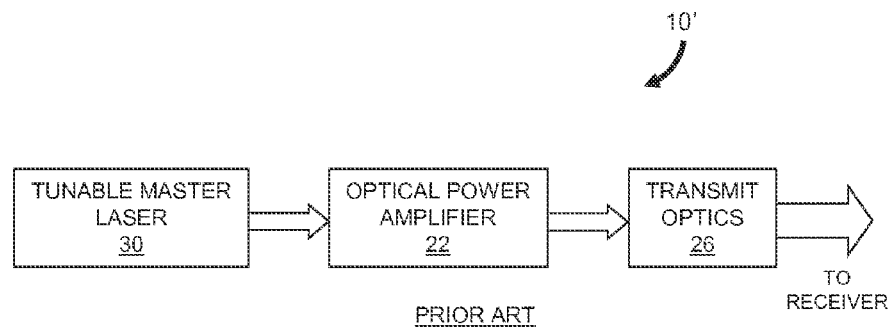
FIG. 2 illustrates an FSK transmitter configuration as is known in the art.
Figure 4A:
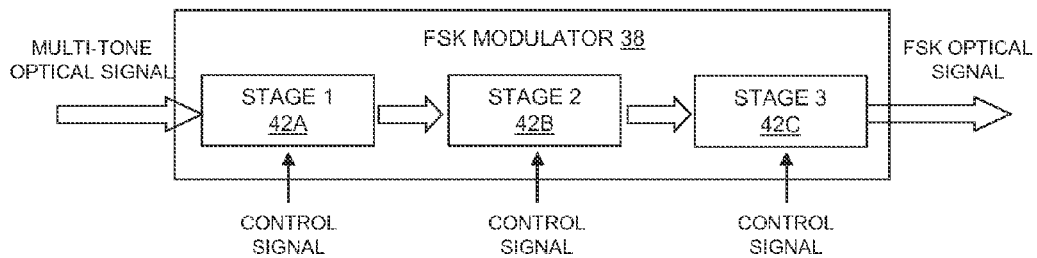
FIG. 4A illustrates an embodiment of an FSK modulator according to the invention.
Figure 3:
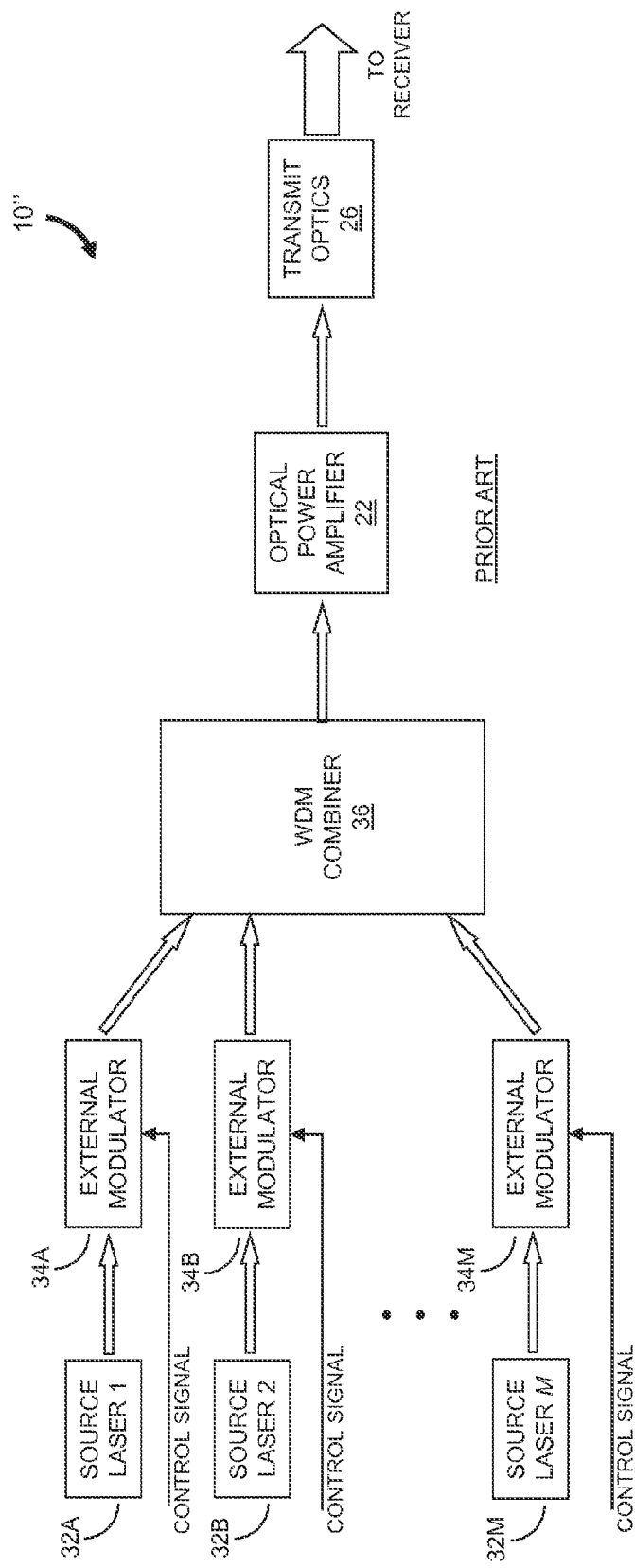
FIG. 3 illustrates another FSK transmitter configuration as is known in the art.
Figure 4B:
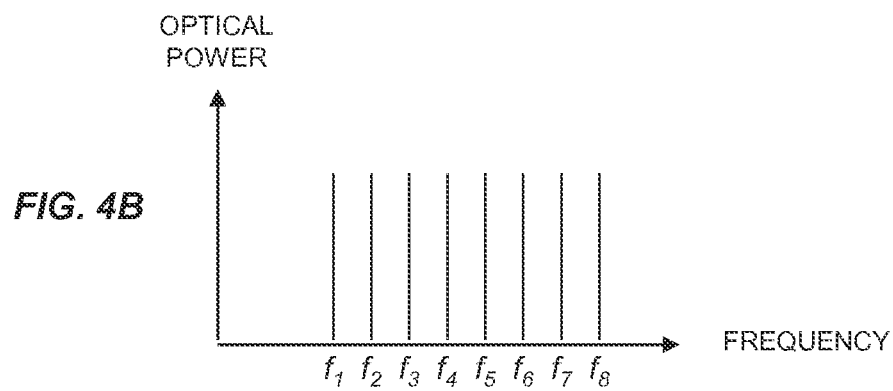
FIG. 4B illustrates the optical spectrum of a multi-tone optical signal propagating from a transmitter source to a first filter stage in the FSK modulator of FIG. 4A.
Figure 4C:
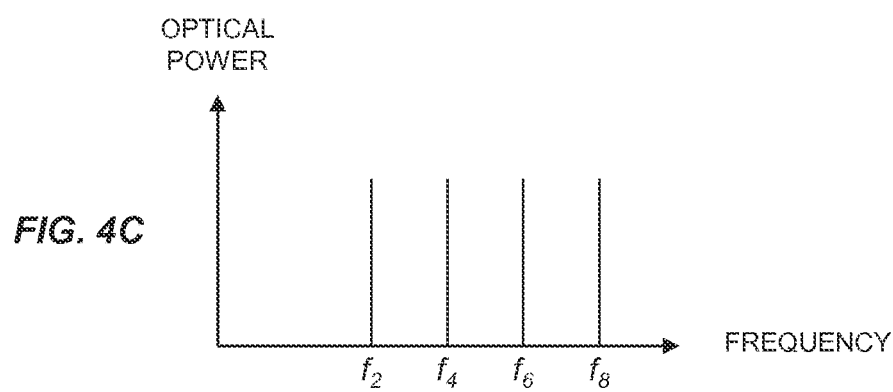
FIG. 4C illustrates the tones in the optical signal received at a second filter stage in the FSK modulator of FIG. 4A.
Figure 4D:
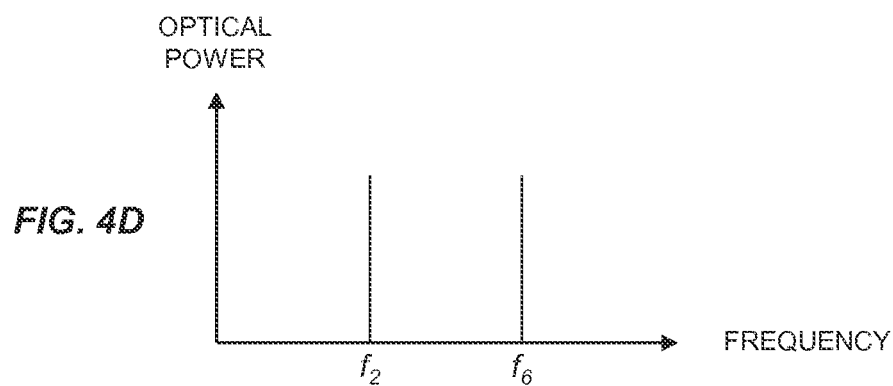
FIG. 4D illustrates the tones in the optical signal received at a third filter stage in the FSK modulator of FIG. 4A.
Figure 4E:
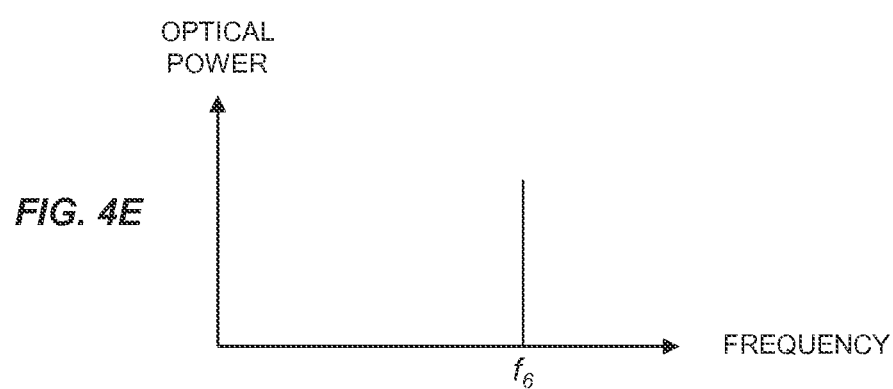
FIG. 4E illustrates the tone in the optical signal exiting the FSK modulator of FIG. 4A.

FIG. 4A illustrates an embodiment of an FSK modulator 38 according to the invention. The modulator 38 includes multiple filter stages 42A, 42B, 42C (generally 42) in serial communication. FIG. 4B illustrates the optical spectrum (having a comb distribution) of a multi-tone optical signal propagating from a transmitter source (not shown) to the first filter stage 42A. Similarly, FIG. 4C illustrates the tones in the optical signal received at the second filter stage 42B, FIG. 4D illustrates the tones in the optical signal received at the third filter stage 42C and FIG. 4E illustrates the tone in the optical signal exiting the FSK modulator 38.

During operation, the multi-tone optical signal having the discrete optical frequency components, or tones, at frequencies $f_1$ to $f_8$, (generally f) is received from a transmitter source such as a mode-locked laser. Each frequency component f is at a single, unique frequency which is separated from adjacent frequency components by a free spectral range (FSR). The phrase "single frequency" as used herein includes a narrow range of frequencies within the linewidth of a laser line or tone as is understood by those of skill in the art. Although only eight frequency components are shown in the illustrated embodiment, the invention contemplates other embodiments in which other numbers of tones can be provided by the transmitter source and that other numbers of filter stages 42 can be included in the FSK modulator 38.

The first filter stage 42A selects, that is, "passes" tones of alternate frequencies in the received multi-tone optical signal. Thus tones at either a first alternating set of frequencies (i.e., odd-indexed frequencies $f_1$, $f_3$, $f_5$ and $f_7$) or a second set of alternating frequencies (i.e., even-indexed frequencies $f_2$, $f_4$, $f_6$ and $f_8$) are selected to remain in the transmitted optical signal according to the value of a control signal applied to the stage 42A. For example, the control signal may be a binary voltage signal having a first value and a second value to select the first and second alternating sets of frequencies, respectively. As illustrated, the control signal has the second value, causing the first filter stage 42A to select the even-indexed frequencies $f_2$, $f_4$, $f_6$ and $f_8$. The second filter stage 42B selects tones of alternate frequencies provided by the first filter stage 42A. Thus either tones at frequencies $f_2$ and $f_6$ are selected or tones at frequencies $f_4$ and $f_8$ are selected according to an applied, control signal. As shown, the control signal has a value that causes frequencies $f_2$ and $f_6$ to be selected. Finally, the third filter stage 42C selects one of the two tones $f_2$ and $f_6$ provided by the second filter stage 42B according to an applied control signal. As illustrated, the control signal has a value that causes a single tone at frequency $f_6$ to be included in the FSK optical signal exiting the FSK modulator 38.

Mach-Zehnder Interferometer Filter Stages

Figure 5A:
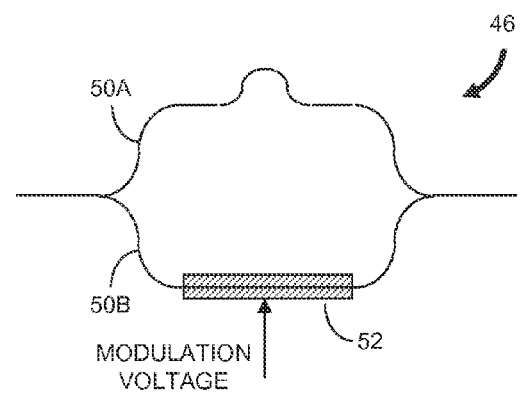
FIG. 5A illustrates a Mach-Zehnder interferometer filter that is used for each filter stage of FSK modulator of FIG. 4A according to one embodiment of the invention.

FIG. 5A illustrates a Mach-Zehnder interferometer (MZI) filter 46 that is used for each filter stage 42 according to one embodiment of the FSK modulator 38. In one embodiment the MZI filters 46 are fiber-coupled lithium niobate electro-optic modulators. The MZI filter 46 has a differential propagation time (i.e., differential delay) T defined between the two interferometer arms 50A, 50B (generally 50) according to the difference in their optical path lengths. The corresponding optical power transfer function for the MZI filter 46 for a particular optical frequency f is given by $$P_{out} \propto P_{in}[1+\cos(2\pi f T)]$$

where $P_{in}$ and $P_{out}$ are the input and output optical powers, respectively.

Figure 5B:
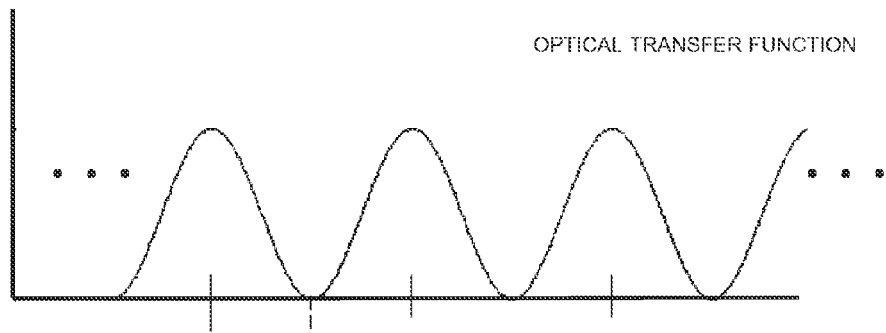
FIG. 5B is a graphical representation of the optical power transfer function of the Mach-Zehnder interferometer filter of FIG. 5A.
Figure 5C:
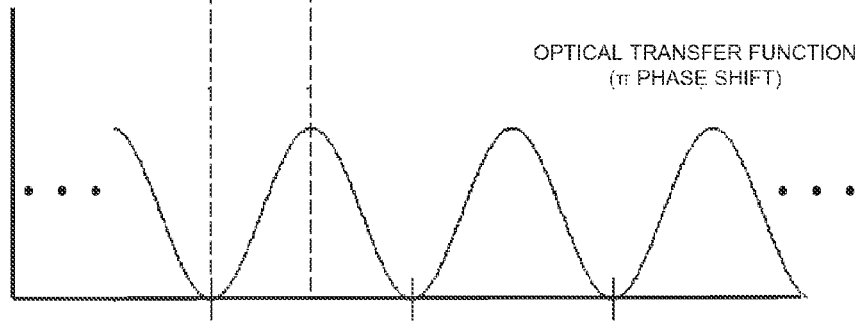
FIG. 5C is a graphical representation of the optical power function of FIG. 5B after changing the optical path length of one of the arms of the Mach-Zehnder interferometer filter of FIG. 5A.

In the frequency domain, the optical power transfer function of the interferometer is cosinusoidal with frequency 1/T, as shown in FIG. 5B. By changing the optical path length of one of the arms 50 by half the period corresponding to the optical frequency (e.g., by using an electro-optic phase modulator 52), the optical power transfer function near the frequency of the optical carrier is shifted so that the peaks of the shifted transfer function shown in FIG. 5C align approximately with the nulls of the unshifted transfer function shown in FIG. 5B. For example, by modulating a voltage applied to the electro-optic modulator 52, the optical path length of the lower arm 50B is changed. Using conventional high-speed optical modulation techniques, the optical power transfer function of the MZI filter 46 can be shifted between the two operating points shown in FIGS. 5B and 5C at a rate than exceeds 40 GHz.

Figure 6:
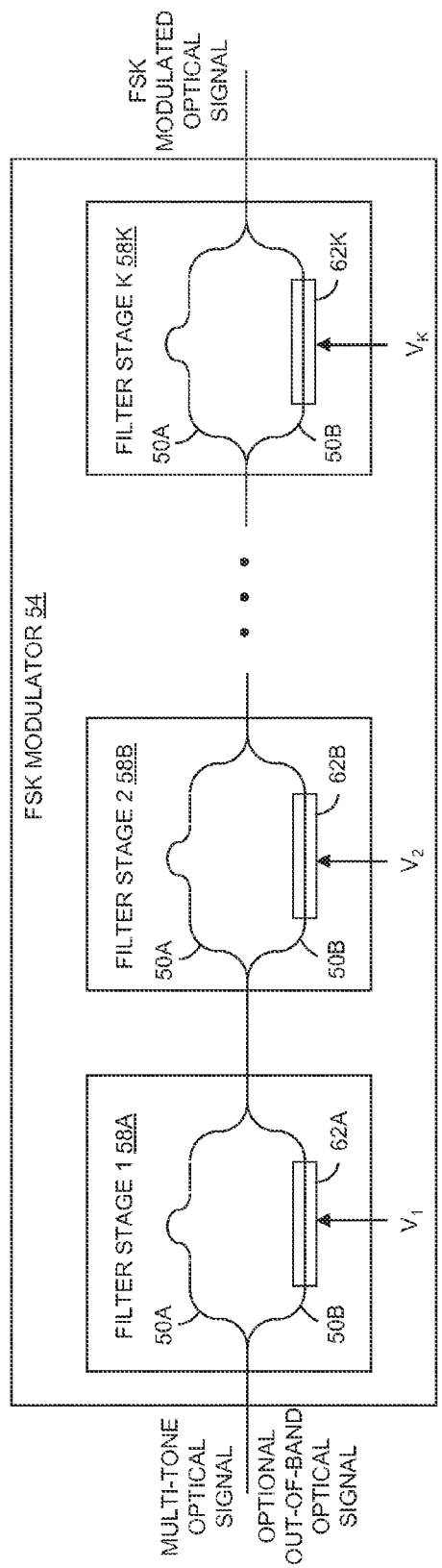
FIG. 6 illustrates another embodiment of an FSK modulator according to the invention.

FIG. 6 illustrates an embodiment of an FSK modulator 54 according to the invention. A source laser (not shown) provides a number M of unique tones separated by a frequency difference F. By way of example, the source laser can be multiple continuous-wave lasers or a mode-locked laser having a repetition rate equal to the desired separation between the FSK tones. (In an alternative embodiment, broadband optical noise such as that realized through amplified spontaneous emission from an optical amplifier is transmitted through a Fabry-Perot etalon to generate the multi-tone optical signal.) The multi-tone optical signal from the source laser is modulated using a number k of MZI filter stages 58A to 58K (generally 58) where k=$\log_2$ M. Filter stage 1 58A has a differential delay of 1/(2F) seconds and a period of 2F. Thus filter stage 1 58A can be used to eliminate one-half of the M tones of the source laser, i.e., the odd-indexed frequencies or the even-indexed frequencies as described above. The particular tones that are filtered depend on the differential phase shift imposed by an electro-optic modulator 62A according to an applied control voltage $V_1$. Thus M/2 tones are provided at the output of filter stage 1 58A. Filter stage 2 58B has a differential delay of 1/(4F) so that the width of a transmission peak in the optical power transfer function in the frequency domain (see, e.g., FIG. 5B) is twice the width of a transmission peak in the optical power transfer function for the first filter stage 58A. Thus filter stage 2 58B can be used to select one-half of the tones provided by filter stage 1 58A. The differential phase shift applied for filter stage 2 58B is responsive to the voltage $V_2$ applied to the electro-optic modulator 62B. The voltage $V_2$ has one of four values corresponding to differential phase shifts of 0, $\pi/2$, $\pi$ and $3\pi/2$. These values enable the optical power transfer function to be shifted to one of four possible positions in frequency. Each subsequent filter stage 58 has a differential delay equal to one-half of the preceding filter stage 58 and twice the number of possible values for its control voltage as used for the preceding filter stage 58. In this manner, a single tone from the laser source remains in the optical signal exiting the $k^{th}$ filter stage.

Preferably a group filter is used to reject all tones outside the operating frequency range of the FSK modulator 54. In a preferred embodiment, the group filter is disposed between the source laser and the FSK modulator 54. Alternatively, the group filter can be provided after the FSK modulator 54. In either embodiment, all tones outside a frequency band defined by the lowest and highest frequencies of the M tones are rejected. In other embodiments of the FSK modulator, the filter stages 58 are arranged sequentially such that the differential delays of subsequent filter stages 58 are not monotonically decreasing while still maintaining the ability to select a single tone for transmission.

Since each of the MZI filter stages 58 in the FSK modulator 54 can be tuned at a rate that exceed 40 GHZ using existing electro-optic modulation techniques, the tone available at the output of filter k can also be selected at a rate exceeding 40 GHz. Only k filter stages are required to select one of M=$2^k$ tones. Thus the modulation technique of the invention enables high-speed (greater than 40 GSymbol/s), large alphabet FSK modulation. The modulation technique can enable future high-bandwidth (greater than 100 Gbit/s) free-space optical links where large transmission alphabets are desirable to obtain high power efficiency at receivers.

Environmental factors such as temperature fluctuations can cause the relative phase difference between the two interferometer arms 50A and 50B of each filter stage 58 to drift or otherwise become unstable. Different techniques can be used to stabilize the filter stages 58 during operation of the FSK modulator. According to one technique, an out-of-band optical signal is employed. For example, the out-of-band optical signal can be from an optical source operating at a different wavelength (e.g., 1330 nm) than the wavelength of the FSK modulated optical signal (e.g., 1550 nm). The out-of-band optical signal is monitored at each filter stage 58 at a low bandwidth relative to the symbol rate but at a high bandwidth relative to the time scale of environmental changes. Responsive "compensation" signals are generated to slowly change the bias voltages of the electro-optic modulators 62, thereby counteracting any drift in the relative phase differences. According to another stabilization technique, each filter stage 58 modulates the received (in-band) optical signal about the peak of its optical transfer function at a low modulation frequency (e.g., 1 KHz). The resulting doubled frequency (e.g., 2 KHz) at the output of each filter stage 58 is monitored to determine changes in the relative phase difference between the two interferometer arms 50A and 50B and to generate a compensation signal to modify the bias voltage of the electro-optic modulator 62.

The high-speed FSK modulator 54 described above can be challenging to implement due to the multi-level modulation required for the MZI filters stages 58. In particular, filter stage 1 58A requires a differential phase shift of 0 or $\pi$. Filter stage 2 58B requires a differential phase shift of 0, $\pi/2$, $\pi$ or $3\pi/2$. The $k^{th}$ filter stage 58K requires one of $2^k$ phase shifts of the form $n\pi/2^{k-1}$, where n=0, 1, ..., $2^k-1$. The multi-level modulation can be achieved by driving the electro-optic modulators 62 with an N-bit digital-to-analog converter (DAC) that provides voltages in the range of 0 to $2V_\pi$, where $V_\pi$ is the drive voltage required to obtain a differential phase shift of $\pi$ in the optical power transfer function. The speed at which modulation is achieved is limited by the speed of the DAC used to generate the drive voltages for the electro-optic modulators 62.

Figure 7:
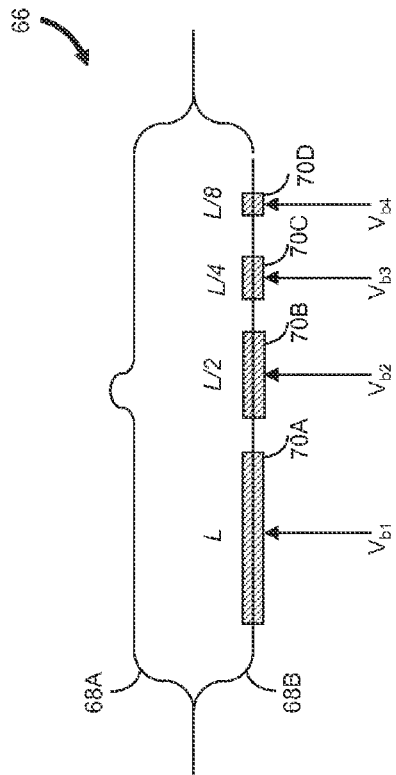
FIG. 7 illustrates a Mach-Zehnder interferometer stage for an FSK modulator according to an embodiment of the invention.

An alternative method for FSK modulation according to the invention achieves higher modulation rates. The phase shift imparted by an electro-optic modulator is generally proportional to the product of an applied voltage and an interaction length between the applied voltage and the optical signal propagating in a waveguide. Typically, the interaction length corresponds to the length of an electro-optic modulator electrode disposed alongside the waveguide. A $k^{th}$ MZI stage 66 can be fabricated as shown in FIG. 7 with k electrodes 70A to 70D (generally 70) of varying length instead of a single electrode. In the illustrated embodiment, the number k of electrodes 70 is four. As shown, each successive electrode 70 is one-half the length of the preceding electrode 70. If each electrode 62 is driven with a binary voltage signal ($V_{b1}$, $V_{b2}$, $V_{b3}$ or $V_{b4}$) having a value of 0 or $V\pi$ (where $V\pi$ is the drive voltage required to obtain a $\pi$ phase shift from the first electrode 70A), any of the desired FSK modulation levels for the $k^{th}$ MZI stage 66 can be achieved. All the electrodes 70 in the FSK modulator that have a common length receive the same binary voltage $V_b$. Thus, for an FSK modulator having a number N of MZI stages, the binary voltage $V_{b1}$ is applied to the electrode of length L in each MZI stage. Similarly, the binary voltage $V_{b2}$ is applied to the electrodes of length L/2 which are present in all but the first MZI stage. In a more generalized sense, the binary voltage $V_{bx}$ is applied to all electrodes of a corresponding length which are present in N−x+1 of the MZI stages.

The binary voltages $V_{bx}$ applied to the electrodes 70 are the same voltage signals that would be used as digital inputs to the DAC described above. Thus the illustrated multi-electrode MZI filter architecture eliminates the need for the DAC and enables modulation at greater speeds.

In other embodiments, the arrangement and operation of the electrodes 70 differ from that shown in FIG. 7 and described above. For example, the electrodes 70 need not be arranged serially according to a monotonically-decreasing length. Also, the electrodes 70 can be disposed on both arms 68A and 68B where the binary voltages can be different than those described above yet still achieve the number and value of the modulation levels for each MZI stage as described above. In still other embodiments, the multi-electrode interferometer configurations can be determined according to an alternative translation from bits to tones. In such embodiments, a logical calculation of bits to drive level is performed in addition to the digital to analog conversion.

Microring Resonator Filter Stages

Figure 8A:
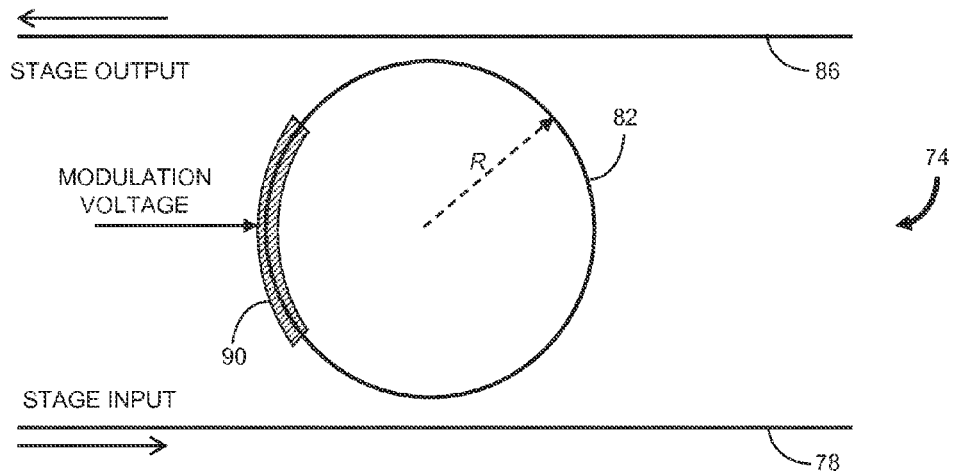
FIG. 8A illustrates a microring resonator filter that can be used as a filter stage of FSK modulator according to an embodiment of the invention.

According to an alternative to the embodiment of the FSK modulator 38 shown in FIG. 4A, a microring resonator (MR) filter 74 shown in FIG. 8A is used for each filter stage 42. The MR filter 74 includes a first (input) waveguide 78, a microring resonator 82 and a second (output) waveguide 86. The microring resonator 82 has a closed, loop form such as the illustrated circular shape; however, the resonator 82 can also be in the form of an ellipse, racetrack or other closed-loop shape that can support traveling wave resonant modes without high loss as is known in the art. Optical power is coupled from the first waveguide 78 to the microring resonator 82 by evanescent coupling. The resonator 82 supports resonant wavelengths $\lambda_0$ given by $$\lambda_0 = (2\pi R n_e)/N$$

where R is the radius of the microring 82, $n_e$ is the effective refractive index of the mode supported in the microring 82 and N is an integer value, and which are not significantly attenuated due to waveguide material attenuation and other loss mechanisms. Energy in the microring resonator 82 at the resonant frequencies is coupled to the second waveguide 86. Tones in the optical signal propagating in the first waveguide 78 that are not coupled into the microring resonator 82 continue to propagate in the first waveguide 78.

Figure 8B:
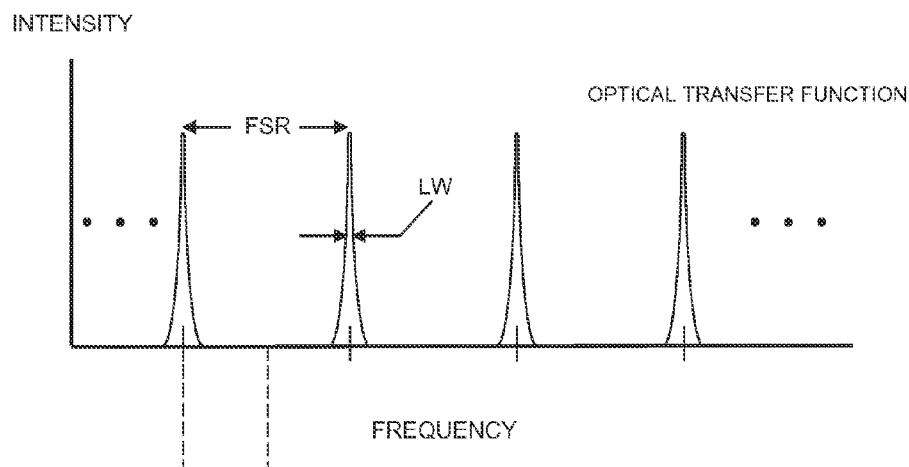
FIG. 8B is a graphical representation of the optical power transfer function of the microring resonator filter of FIG. 8A.
Figure 8C:
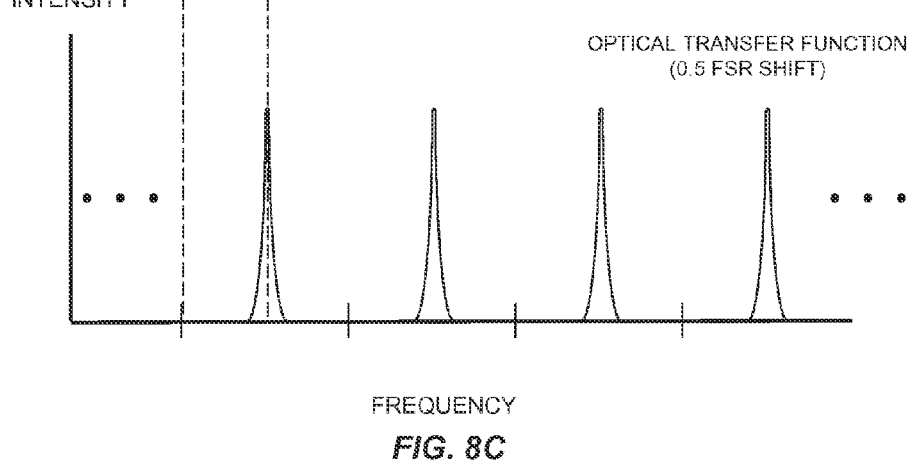
FIG. 8C is a graphical representation of the optical power transfer function of FIG. 8B after changing the optical path length of the microring resonator of FIG. 8A.

The optical power transfer function of the MR filter 74 is shown in FIG. 8B. By changing the optical path length of the microring resonator 82 by half the period, the optical power transfer function near the optical carrier is shifted by approximately half the FSR as shown in FIG. 8C. For example, the optical path length of the microring 82 is changed by changing a voltage V applied to an electro-optic modulator electrode 90, allowing the modulation of the optical power transfer function at rates that can exceed 40 GHz.

MR filter stages 74 used in embodiments of the FSK modulator can have radii of tens of microns or less. Thus the MR filter stages 74 are much smaller than the equivalent MZI filter stages described above. Potentially, a single MR filter stage 74 can be fabricated to a small dimension to simplify the FSK modulator by achieving an FSR that is at least as great as the modulator wavelength range. For example, for a C-band FSK modulator the operating wavelength range is approximately 30 nm. Consequently, a single MR filter stage 74 having a microring 82 with a radius R of 5 μm or less is capable of selecting a single tone; however, fabrication of the desired number of electrodes 90 of decreasing size presents a significant challenge. Moreover, use of a single MR filter stage 74 for a large number of tones requires both a large FSR and a small passband. Consequently, the MR filter stage 74 is required to have a high quality factor (Q) than can limit how rapidly the filter stage can be tuned, making an FSK modulator utilizing multiple MR filter stages more desirable.

Figure 9:
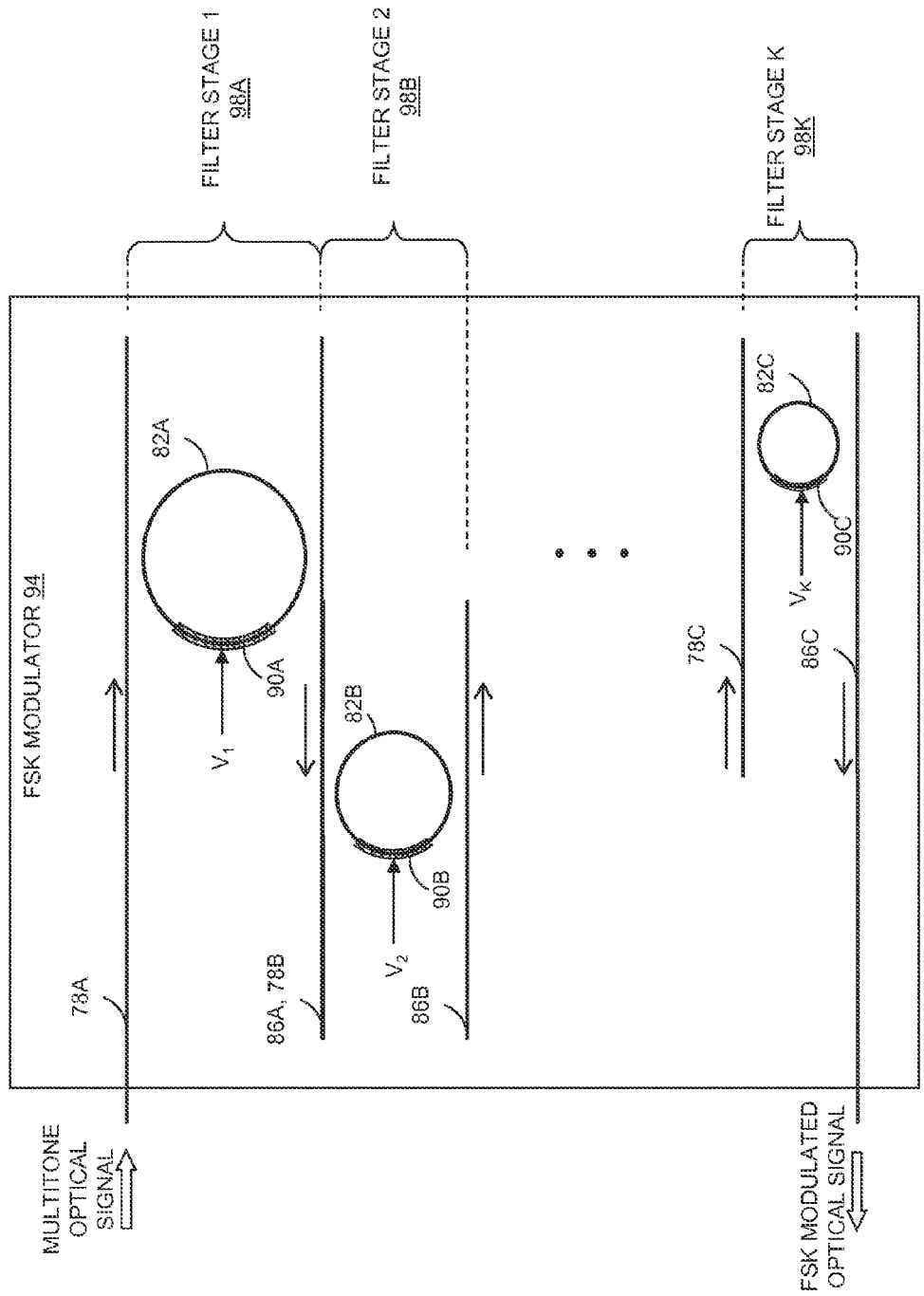
FIG. 9 illustrates another embodiment of an FSK modulator according to the invention.

FIG. 9 illustrates another embodiment of an FSK modulator 94 according to the invention. A multi-tone optical signal having a number M of unique tones is modulated using a number k of MR filter stages 98A to 98K (generally 98) where k=$\log_2$ M. Each filter stage 98 has a microring 82 of a different radius (and different optical path length) so that the optical power transfer functions have different FSRs. Filter stage 1 98A is used to eliminate one-half of the M tones provided to the modulator 94 according to the applied voltage $V_1$, filter stage 2 98B eliminates one-half of the M/2 tones provided by filter stage 1 98A according to the applied voltage $V_2$, and so on until after the $k^{th}$ filter stage 98K only a single tone from the multi-tone optical signal remains.

Due to the high finesse of the optical power transfer function of the MR filter stages 98, the invention contemplates embodiments in which the number of filter stages 98 is less than k. For example, design constraints such as modulation speed and alphabet size may make it desirable to employ a reduced number of filter stages 98. In other embodiments, the configuration of microrings 82 can be different from that shown in FIG. 9. For example, the microrings 82 can be positioned near each for direct evanescent coupling between adjacent microrings 82. Thus intervening waveguides (e.g., waveguides 78B, 78C, 86A and 86B) can be eliminated.

Figure 10:
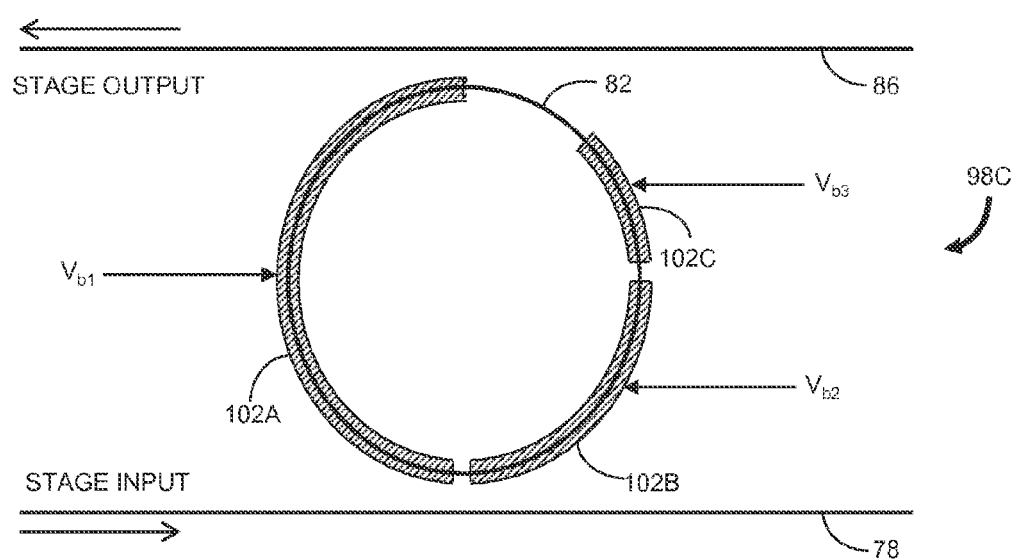
FIG. 10 illustrates a microring resonator filter stage for an FSK modulator according to an embodiment of the invention.

FIG. 10 illustrates an MR filter stage 98C having three electro-optic modulator electrodes 102A, 102B and 102C (generally 102). The arc lengths of the electrodes 102 and the corresponding drive voltages $V_{b1}$, $V_{b2}$, and $V_{b3}$ are similar to the lengths of the linear electrodes 70 and drive voltages of FIG. 7. Thus an FSK modulator can be fabricated using multiple MR filter stages 98 with varying numbers and lengths of electrodes 102 to avoid the need for a DAC and thereby achieve greater modulation speeds.

While the invention has been shown and described with reference to specific embodiments, it should be understood by those skilled in the art that various changes in form and detail may be made therein without departing from the spirit and scope of the invention.

What is claimed is:

1. A frequency-shift keying modulator for optical communications comprising:

a first filter stage having an input optical path to receive a multi-tone optical signal having a plurality of tones, an output optical path and a first microring resonator having a first optical path length and being disposed between the input and output optical paths, the first microring resonator having an electro-optic modulator disposed therein to modulate the first optical path length in response to a first control signal having a time-dependent signal value determined according to a communications signal to be transmitted, wherein a subset of the tones in the multi-tone optical signal are provided in a first filtered optical signal in the output optical path of the first filter stage; and a second filter stage having an input optical path in optical communication with the output optical path of the first filter stage, an output optical path and a second microring resonator having a second optical path length and disposed between the input and output optical paths, the second microring resonator having an electro-optic modulator disposed therein to modulate the second optical path length in response to a second control signal having a time-dependent signal value determined according to the communications signal to be transmitted, the second control signal having a number of time-dependent signal values that is twice a number of time-dependent signal values of the first control signal, wherein a subset of the tones in the first filtered optical signal are provided in a second filtered optical signal in the output optical path of the second filter stage.

2. The frequency-shift keying modulator of claim 1 further comprising a multi-tone optical source in optical communication with the input optical path of the first filter stage.

3. The frequency-shift keying modulator of claim 1 further comprising a group filter in optical communication with one of the first and second filter stages.

4. A frequency-shift keying modulator for optical communications comprising:

a first filter stage having an input optical path to receive a multi-tone optical signal having a plurality of tones, an output optical path and a first microring resonator having a first optical path length and disposed between the input and output optical paths, the first microring resonator having at least one electro-optic modulator electrode disposed therein to modulate the first optical path length in response to a first control signal having a time-dependent signal value determined according to a communications signal to be transmitted, wherein a subset of the tones in the multi-tone optical signal are provided in a first filtered optical signal in the output optical path of the first filter stage; and a second filter stage having an input optical path in optical communication with the output optical path of the first filter stage, an output optical path and a second microring resonator having a second optical path length and disposed between the input and output optical paths of the second filter stage, the second microring resonator having at least one electro-optic modulator electrode disposed therein to modulate the second optical path length in response to a second control signal having a time-dependent signal value determined according to a communications signal to be transmitted, wherein the numbers of electro-optic modulator electrodes in the first and second microring resonators are different, a length of at least one of the electro-optic modulator electrodes of one of the microrings being less than the lengths of the electro-optic modulator electrodes of the other microring, wherein at least one tone of the multi-tone optical signal is selected for transmission through the first and second filter stages according to the first and second control signals.

5. The frequency-shift keying modulator of claim 4 further comprising a multi-tone optical source in optical communication with the first filter stage.

6. The frequency-shift keying modulator of claim 4 wherein a difference in an applied voltage at a maximum value of the time-dependent signal values of the first and second control signals is based on a voltage which, when applied to a longest electro-optic modulator electrode of one of the microrings, causes a differential phase shift of one-half the free spectral range of an optical power transfer function of the respective microring.

* * * * *